Jan. 26, 1971 — L. A. BIXBY — 3,557,634

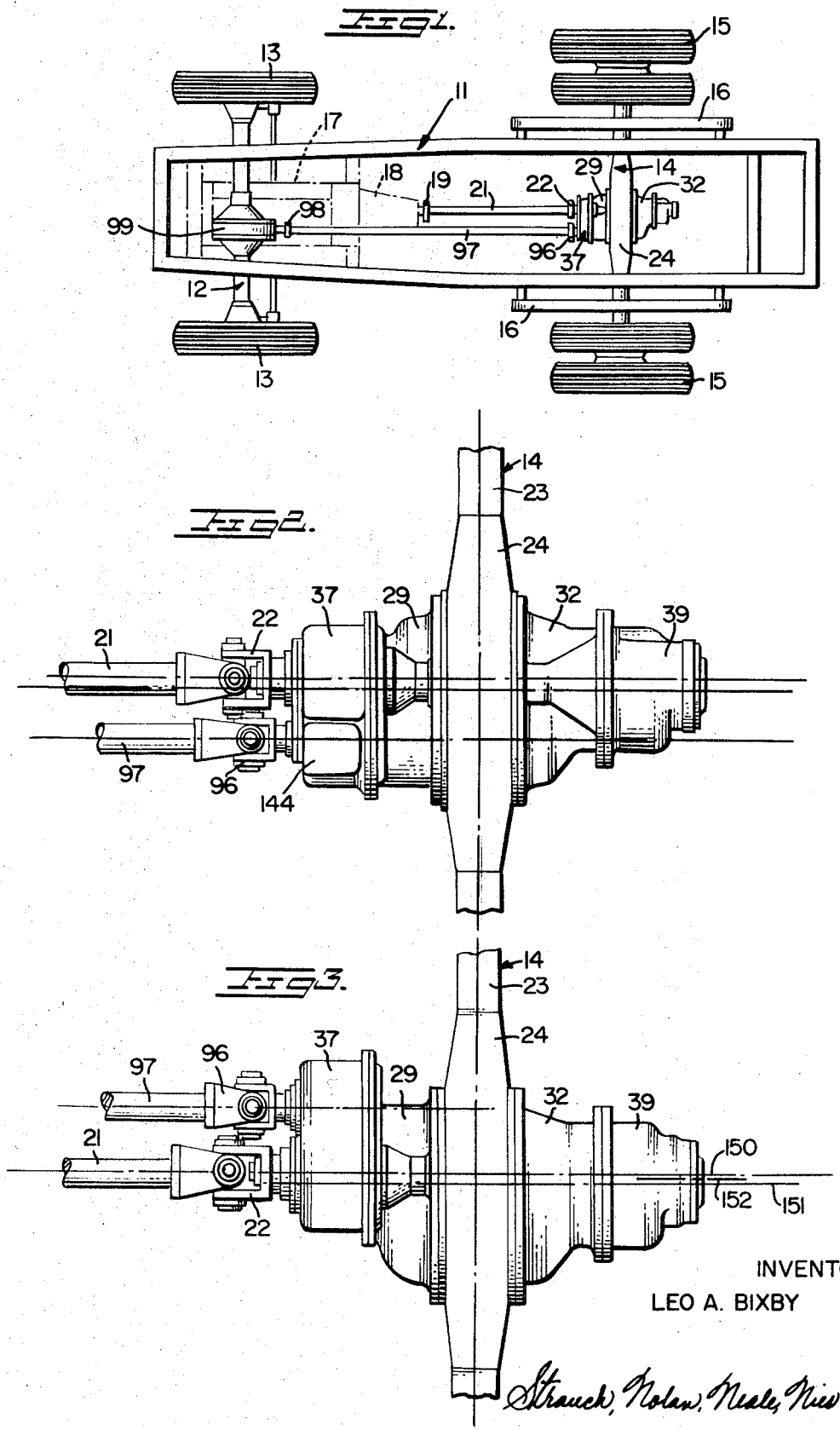

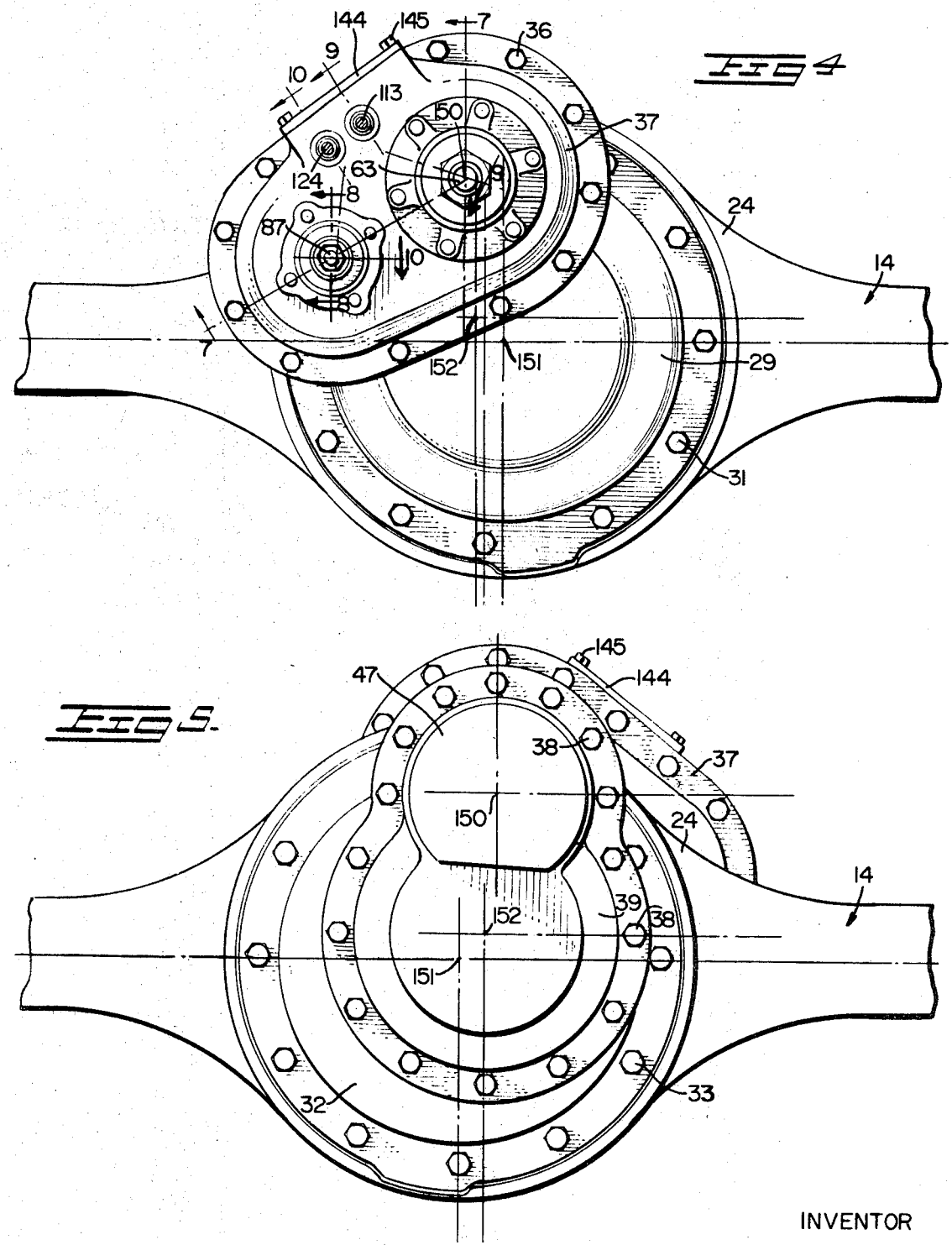

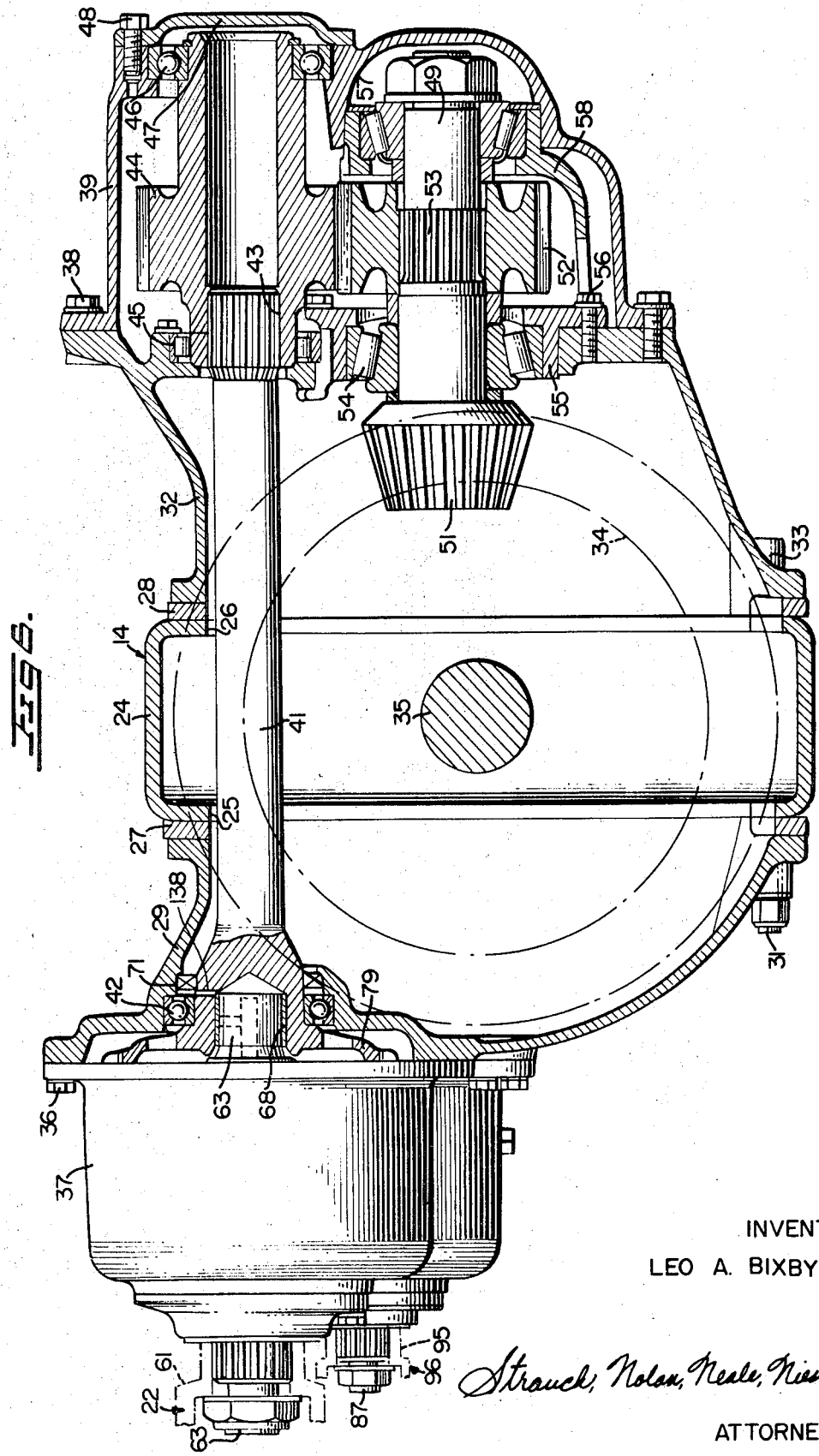

AUTOMOTIVE DRIVE SYSTEM

Filed Dec. 12, 1968 — 5 Sheets-Sheet 4

INVENTOR
LEO A. BIXBY

Strauch, Nolan, Neale, Nies & Kurz
ATTORNEYS

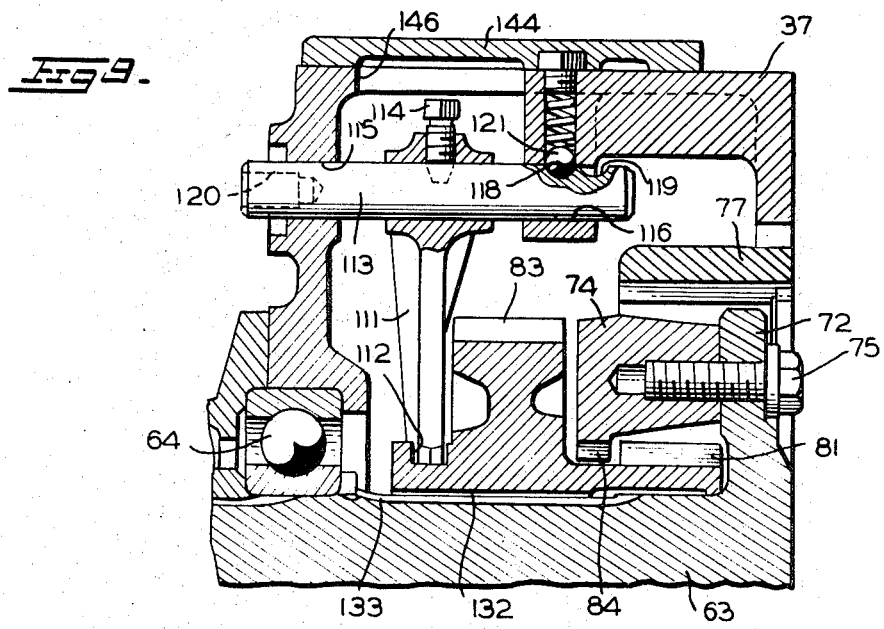
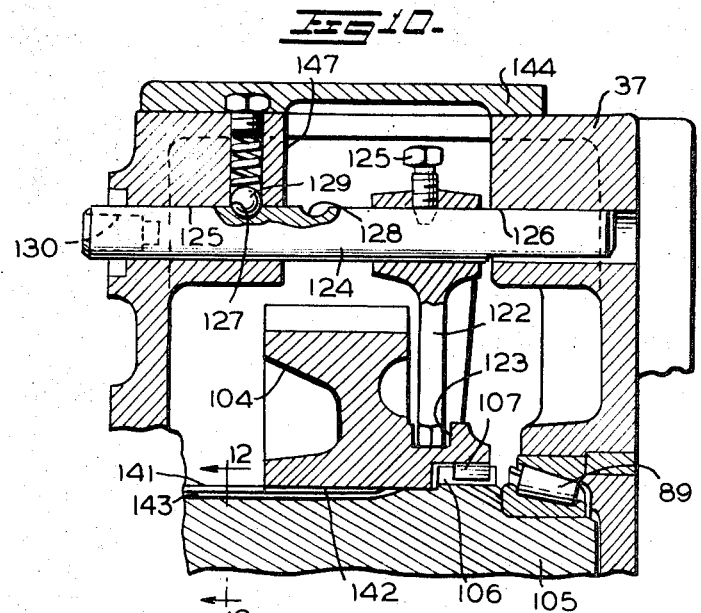
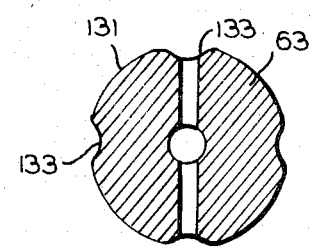
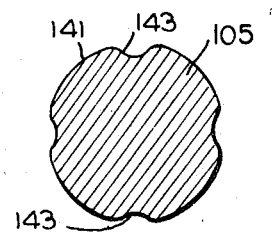

United States Patent Office 3,557,634
Patented Jan. 26, 1971

3,557,634
AUTOMOTIVE DRIVE SYSTEM
Leo A. Bixby, Niles, Mich., assignor, by mesne assignments, to Rockwell-Standard Company, Pittsburgh, Pa., a corporation of Delaware
Filed Dec. 12, 1968, Ser. No. 783,219
Int. Cl. B60k 17/34; F16h 1/44, 1/42
U.S. Cl. 74—710.5                    10 Claims

ABSTRACT OF THE DISCLOSURE

A short wheel base vehicle having a single power plant and forward and rearward drive axles incorporates a power dividing gear arrangement mounted on the rearward axle. The rearward axle housing has front and rear extensions mounting, in balanced weight distribution with respect to the axle, a forward proportional differential gear set and a rearward drop gear set. The forward gear set comprises a planet carrier driven by the input shaft and mounting planet gears that are meshed with a sun gear drive connected to an output shaft for driving the forward axle. The planet gears are also meshed with a ring gear fixed on an output shaft that extends to the drop gear set which includes a pinion driving the rearward axle. The sun gear may be clutched directly to the input shaft for direct drive of both axles.

BACKGROUND AND SUMMARY OF INVENTION

This invention relates to an automotive drive system incorporating proportional power dividing devices and particularly to such devices as are adapted to relatively short wheel base heavy duty trucks, tractors and like vehicles wherein both the forward and rearward axles are driven from a common power plant.

Considerable attention has been devoted to the development of vehicles wherein the forward and rearward axles are driven, and, for example, Bixby Pat. No. 3,095,758 discloses a power dividing device mounted on the transmission and providing for dividing the torque so that about ⅓ is delivered to the forward drive axle and about ⅔ is delivered to the rearward axle.

While this patented arrangement has proved satisfactory for many vehicles, problems have been encountered in the development of relatively short wheel base vehicles wherein there may not be sufficient space available between the axles to install such a device either on the transmission or on the chassis.

The invention contemplates mounting a proportional power dividing device on the rearward drive axle. This involves further problems caused by increase in the so-called unsprung weight which of itself is usually avoided in heavy duty vehicles because of the tendency to increase axle and tire wear as well as suspension damage. The invention solves these problems by providing a balanced structural arrangement, wherein a proportional differential assembly, dividing power from the power plant between the forward and rearward axles, is mounted in a novel manner on the rearward axle, and this is a major object.

Further objects of the invention involve novel rearward axle housing structure and proportional gearing arrangements which will become apparent in connection with the appended claims.

BRIEF DESCRIPTION OF DRAWINGS

FIG. 1 is a diagrammatic plan view showing a preferred embodiment of the invention incorporated in a multiple wheel drive vehicle;

FIGS. 2 and 3 are similar enlarged fragmentary plan views showing the rearmost drive axle, with the propeller shaft and the drive shaft to the foremost drive axle shown at different sides;

FIG. 4 is a fragmentary enlarged front elevation of the rearmost axle showing the location of the differential housing as viewed for example in FIG. 3;

FIG. 5 is a diagrammatic rear view of the rearmost axle of FIG. 4 showing shaft locations;

FIG. 6 is an enlarged side elevation mainly in section substantially on the pinion centerline of the rearmost axle;

FIG. 9 is a fragmentary section substantially on line 9—9 of FIG. 4 showing the shift mechanism for the differential lockout;

FIG. 10 is a fragmentary view in section substantially on line 10—10 of FIG. 4 showing the shift mechanism for the foremost axle drive clutch of FIG. 8;

FIG. 11 is a section substantially on line 11—11 of FIG. 7 showing the shaft structure; and FIG. 12 is a section in the direction of line 12—12 of FIG. 10 showing the front drive shaft structure in the embodiment of FIG. 8.

PREFERRED EMBODIMENTS OF INVENTION

Figures 7, 8:
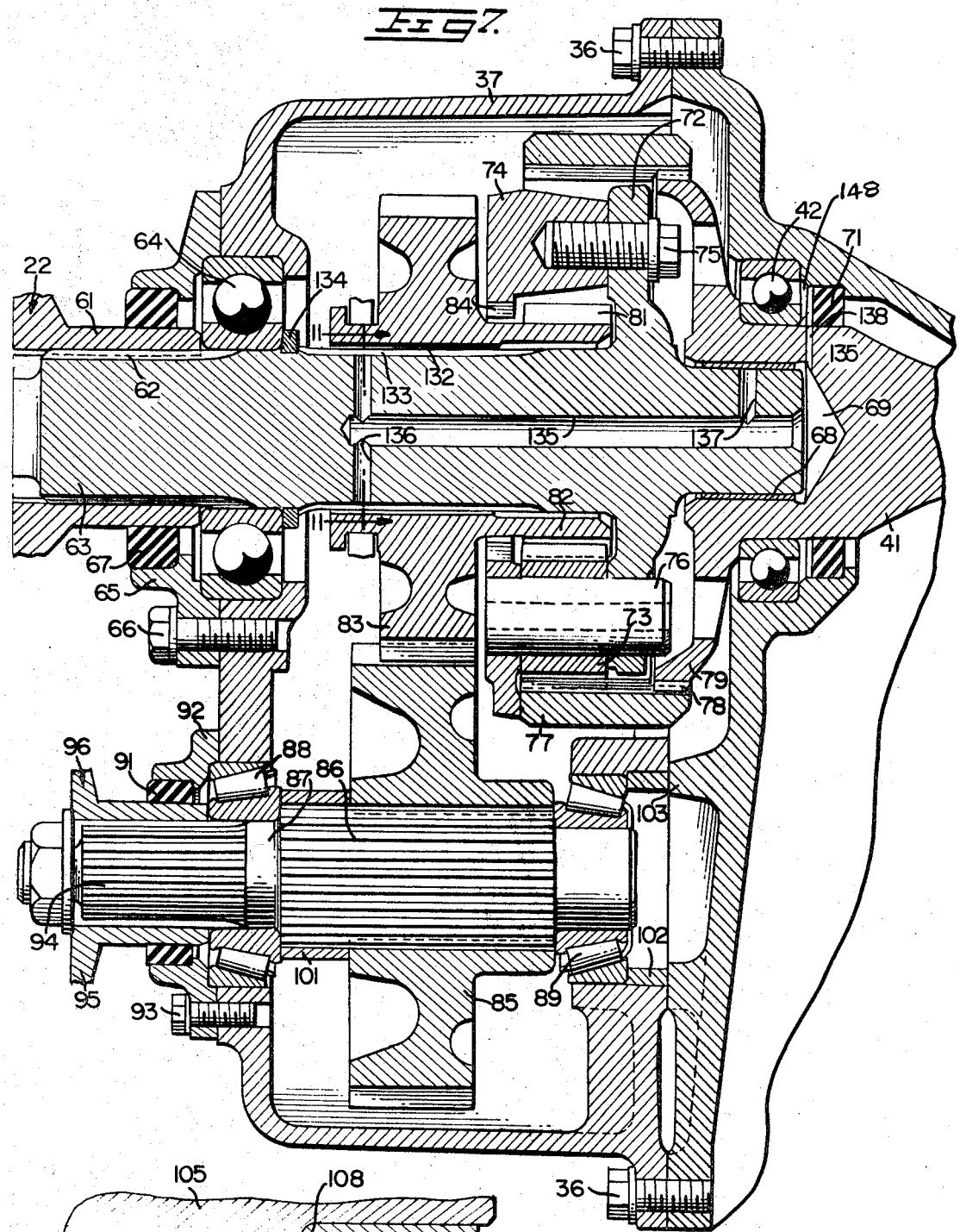
FIG. 7 is an enlarged section substantially on line 7—7 of FIG 4 showing part of the gearing within the differential housing.
FIG. 8 is a fragmentary section substantially along line 8—8 of FIG. 4 showing an embodiment where the drive to the foremost axle contains a clutch.

Referring to FIG. 1 a vehicle chassis 11 is supported by a forward steer drive axle assembly 12 having ground engaging wheels 13 and a rearward drive axle assembly 14 having ground engaging wheels 15. Axle assembly 14 is connected to the chassis as by conventional leaf springs 16, and similar or equivalent springs (not shown) are provided between the forward axle and the chassis.

An internal combustion engine or like power plant 17 is mounted on the forward part of the chassis, and this includes a transmission unit 18 having its output connected by a universal joint 19 to a propeller shaft 21. Shaft 21 is connected through a universal joint 22 to the input side of rearward axle 14 as will later appear.

The invention will thus be described as preferably applied to a relative short wheel base 4 x 4 vehicle drive. It is, for example, also equally well applicable to trailer tractor wherein the axles are even more closely spaced.

Rearward drive axle 14 comprises a conventional non-rotatable housing 23 having an enlarged intermediate section 24 wherein the usual differential mechanism is mounted. As shown in FIG. 6, axle housing section 24 has front and rear openings 25 and 26 respectively surrounded by welded-on reenforcement rings 27 and 28. A forwardly projecting housing section 29 is secured over opening 25 as by a row of studs 31, and a rearwardly projecting housing section 32 is secured over opening 26 as by a row of studs 33.

Housing sections 29 and 32 are of sufficient size to provide for enclosure of the differential mechanism which is indicated therewithin by the ring gear 34 which drives the usual bevel gear differential unit that has its side gears connected to opposed axle shafts 35 leading to the ground engaging wheels.

Secured over an opening in the forward end of housing section 29, as by a row of bolts 36, is a differential housing 37, and secured over the open rear end of housing section 32, as by a row of bolts 38 is a drop gear housing 39.

A generally horizontal shaft 41 has its forward end rotatably mounted in housing section 29 by ball bearing assembly 42, and shaft 41 extends through the axle housing sections into the gear housing 39 where it is non-rotatably connected by a splined section 43 to the hub of a spur gear 44. Gear 44 is rotatably mounted by a roller bearing assembly 45 in the rear wall of housing section 32 and a ball bearing assembly 46 in gear housing 39. A cap 47 secured in place by bolts 48 encloses bearing 46.

A pinion shaft 49 carrying a bevel pinion 51 meshed with bevel ring gear 34 is rotatably mounted on an axis parallel to shaft 41, and shaft 49 carries a spur gear 52 non-rotatably keyed or splined thereto at 53 and meshed with gear 44. The forward end of shaft 49 is supported by a tapered roller bearing assembly 54 carried by a retainer ring 55 secured to housing section 32 as by a row of bolts 56. The rear end of shaft 49 is supported by a tapered roller bearing assembly 57 in a cage 58 rigid with the gear housing.

Referring to FIG. 7, the yoke hub 61 of universal joint 22 on the propeller shaft is non-rotatably connected as by splines 62 to one end of an input shaft 63 that is rotatably mounted on the differential housing 37 by a ball bearing assembly 64. A bearing retainer 65 secured to the housing by bolts 66 carries an oil seal 67 surrounding yoke hub 61.

The inner end of shaft 63 is coaxially rotatably mounted by a bearing sleeve 68 in a recess 69 in the adjacent recessed end of shaft 41. An oil seal 71 surrounds shaft 41 adjacent bearing 42.

Shaft 63 is formed with an integral radial flange 72 which serves as one side of a carrier rotatably mounting a circumferentially spaced series of planet gears 73. The other side 74 of the carrier is secured to flange 72 by a series of bolts 75 and fixed pins 76 extend between the sides for rotatably mounting planet gears 73.

Planet gears 73, usually three in number, are meshed with an integral ring gear 77 that is non-rotatably mounted, as by a splined connection shown at 78, to an enlarged radial end flange 79 on shaft 41. Preferably the splined connection 78 allows limited radial and axial float of ring gear 77 during operation.

Planet gears 73 are also meshed with a sun gear 81 that is integral with the hub 82 of a spur gear 83 that is axially slidably and freely rotatably mounted on shaft 63.

Carrier side 74 is formed with an internal row of teeth 84 which are adapted to be engaged in clutching relation by the teeth of sun gear 81 when gear 83 is shifted to the left from the position shown in FIG. 7, for a purpose to appear.

Gear 83 is constantly meshed with a spur gear 85 that is non-rotatably mounted as by splines 86 upon forwardly extending output shaft 87 rotatably supported by a tapered roller bearing assembly 88 in the front wall of housing 37 and a roller bearing assembly 89 in the rear wall of housing 37.

At its forward end shaft 87 projects through an oil seal 91 carried by a bearing retainer 92 secured on the housing by bolts 93 and is formed with a splined section 94 on which is non-rotatably mounted the yoke 95 of a universal joint 96 that (FIG. 1) is coupled to a drive shaft 97 which is connected through universal joint 98 to conventional differential mechanism within the enlarged housing 99 of front drive axle 12, the differential mechanism in turn being connected by axle shaft assemblies to wheels 13.

The inner race of bearing assembly 88 abuts an axially rigid spacer 101 which abuts the one end of the hub of gear 85. The other end of the hub of gear 85 abuts the inner race of bearing assembly 89 and an axially rigid spacer 102 that seats against a ribbed section 103 on housing 29. Thus, when the parts are in the position shown in FIG. 7, bearings 88 and 89 are loaded and gear 85 is fixed against axial movement when retainer 92 is tight in place.

Referring to FIGS. 8 and 10 there is illustrated an embodiment wherein the parts are all the same as in FIGS. 1–7 except that instead of gear 85 fixed on shaft 87 a gear 104 constantly meshed with gear 83 is axially slidably and freely rotatably mounted on an output shaft 105 rotatably mounted in bearings 88 and 89.

Shaft 105 differs from shaft 87 in that shaft 105 is cylindrical where it supports gear 104 as will later be described in connection with FIG. 12 and it is formed with an annular row of external clutch teeth 106. Gear 104 is formed with an internal row of clutch teeth 107 shown engaged with teeth 106 in FIGS. 8 and 10 so that in this condition gear 104 drives shaft 105.

The spacer 101 is omitted in this embodiment, and so gear 104 may be shifted to the left in FIG. 10 to disengage teeth 106 and 107 and thereby interrupt drive to the forward axle.

The inner race of bearing 89 is here in abutment with a shaft shoulder 108 and the inner race of bearing 88 abuts a similar shaft shoulder (not shown) when retainer 92 is tightened in place.

Referring now to FIGS. 4, 7 and 9, the gear 83 is shifted along shaft 63 by means of a bifurcated fork 111 engaged within an annular groove 112 in the hub of gear 83. Fork 111 is fixed on a slide rail 113, as by a setscrew 114. Rail 113 is longitudinally slidably mounted in spaced housing bores 115 and 116. Rail 113 is formed with recesses 118 and 119 which coact with a spring pressed detent ball 121 on the housing to retain the shifted gear 83 in either the illustrated declutched position of FIGS. 7 and 10 or a clutched position to the left wherein teeth 84 and 81 are meshed and shaft 63 directly drives gear 83. Rail 113 is formed at its end at 120 where it projects from the housing to attach a suitable actuator.

Referring to FIGS. 4, 8 and 10, the gear 104 is shifted along shaft 105 by a fork 122 engaged within an annular groove 123 on the hub of gear 104. Fork 122 is fixed on a side rail 124 as by a setscrew 125. Rail 124 is longitudinally slidably mounted in housing bores 125 and 126, and is formed with recesses 127 and 128 which coact with a spring pressed detent ball 129 to retain the shifted gear 104 in either the illustrated clutched front axle drive condition of FIGS. 8 and 10, or in the position where teeth 106 and 107 are disengaged and gear 104 does not drive the front axle. The projecting end of rail 124 is formed at 130 for attachment of a suitable actuator.

The shift mechanism of FIG. 10 is, of course, not used where the gear for driving the forward axle is fixed to its shaft as in FIG. 7.

FIG. 11 illustrates the configuration of shaft 63 where it rotatably and axially slidably supports gear 83 as seen in FIG. 7. Here the shaft has a cylindrical surface 131 corresponding to the cylindrical internal surface 132 of the gear hub. Shaft surface 131 is formed with a plurality of equally spaced longitudinal lubricant conducting recesses 133 that extend from a fixed snap ring 134 abutting the inner race of bearing 64 to a point within the sun gear section. Shaft 63 is formed with a central lubricant passage 135 that is connected at one end to a diametrical passage 136 extending between two recesses 133 and is open at its other end to recess 69. A branch passage 137 connects passage 135 to lubricate bushing 68. Two or more radial passages 138 in shaft 41 connect recess 69 to the space 148 between bearing 42 and oil seal 71. An oil trough (not shown) located on the forward wall of housing 29 is connected by an oil passage to space 148.

Thus lubricant oil lifted from the bottom of housing 37 by the rotation of the gears and other members flows into space 148 from the said oil trough to lubricate bearing 42 and through passages 138 into recess 69 and thence through passages 135 and 137 to lubricate internal surface 132 of gear 83 and bushing 68.

FIG. 12 illustrates the contour of shaft 104 in FIG. 8 where it supports gear 105. The shaft has a cylindrical periphery 141 in this region corresponding with the cylindrical internal surface 142 of the gear hub and is formed with a plurality of longitudinal surface recesses 143 that convey lubricant to lubricate the gear in operation.

A flat cover 144 secured to housing 37 as by a row of bolts 145 (FIG. 4) extends over openings 146 (FIG. 9) and 147 (FIG. 10) for access to the shift mechanisms.

FIGS. 2 and 3 differ only in showing that the differential housing 37 and axle housing section 29 may be shaped to provide for vehicle drives wherein the propeller shaft 97 and differential 99 of the forward axle are located on opposite sides of the longitudinal vehicle centerline. The mechanisms therein are arranged in essentially the same order as described in connection with FIGS. 4–12. Referring to FIGS. 2–5, the centerline of input shaft 63 is indicated at 150, the longitudinal centerline of the vehicle which here coincides with the center of the axle 14 is indicated at 151, and the centerline of pinion 51 is indicated at 152. In either arrangement the input torque is divided ⅓ to the forward axle and ⅔ to the rearward axle.

Referring to FIG. 6 particularly, it will be seen that the axle housing structure and gearing arrangements provide a balanced distribution of weight forwardly and rearwardly of the rearward axle centerline. The housing sections 29 and 32 are of such length longitudinally of the vehicle, in fact they are about equal in length, that the weights of housing 37 and the associated gearing on the one hand and housing 39 and the associated gearing on the other hand exert about equal and opposite moments, and this balance substantially eliminates any tendency of the added weight to rotate the axle housing about its longitudinal axis.

The invention thereby provides an efficient proportional power dividing arrangement for short wheel base vehicles that can be adapted to axle spacings that do not permit mounting the power divider on the chassis or transmission. The arrangement is compact and readily serviced since the housings 37 and 39 may be separately removed without disassembly of the axle itself.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A drive axle assembly comprising a transverse axle housing enclosing axle shafts connected by a differential, and drive proportioning gearing mounted on said housing in forwardly and rearwardly spaced sets providing balanced weight distribution effective to minimize moment forces tending to turn said housing about its longitudinal axis.

2. A drive axle assembly comprising a transverse housing having forwardly and rearwardly projecting sections and containing axle differential mechanism, a first set of gearing in said forward section dividing an input into two outputs, a second set of gearing in the rearward section connected to one of said outputs by means passing through the housing and providing means transmitting drive to said mechanism.

3. In the drive axle asembly defined in claim 2, the relative weights of said forwardly and rearwardly projecting housing sections and the gear sets therein being such as to provide substantially equal opposed moments effective on said axle housing.

4. In the drive axle assembly defined in claim 2, an input shaft extending into said forward housing section, a first gear rotatably and slidably mounted on said input shaft, two output shafts extending from said forward housing section, an internal ring gear rigid with one of said output shafts, a planet gear carrier rigid with said input shaft and rotatably mounting a plurality of planet gears, a sun gear rigid with said first gear and meshed with said planet gears, a second gear on the other output shaft meshed with said first gear, clutch teeth on said carrier for selectively locking the first gear to said input shaft, and an operator for shifting said first gear along the input shaft to engage or disengage said sun gear with said clutch teeth.

5. In the drive axle assembly defined in claim 4, said second gear being fixed on said other output shaft.

6. In the drive axle assembly defined in claim 4, said second gear being rotatable and axially slidable on said other output shaft, coacting clutch teeth on said second gear and said other output shaft for selectively locking said second gear to said other output shaft, and an operator for shifting said second gear along said other output shaft to engage or disengage said clutch means.

7. In the drive axle assembly defined in claim 2, said second set of gearing comprising a pinion shaft extending into drive relation with said axle differential mechanism, and a train of gears in said rearward housing section connecting said one output shaft to said pinion shaft.

8. In the drive axle assembly defined in claim 2, said input and said one output being coaxial shafts, and said one output shaft extending through the upper part of said axle housing to connect with said second set of gearing, said second set of gearing comprising a pinion shaft drive connected to said axle differential mechanism at a level below said one output shaft.

9. In the drive axle assembly defined in claim 2, said input comprising a shaft rotatably mounted at one end in the adjacent end of a shaft comprising said one output, a bearing in said housing rotatably mounting said one output shaft, and means providing lubricant passage through said input shaft from the interior of said housing to both of said bearings.

10. In the drive axle assembly defined in claim 2, said gear sets each being contained in separable housings detachably mounted on the respective housing sections.

References Cited
UNITED STATES PATENTS

| | | | |
|---|---|---|---|
| 2,796,942 | 6/1957 | Hill | 74—710.5X |
| 2,870,854 | 1/1959 | Keese | 74—710.5X |
| 2,914,128 | 11/1959 | Christie | 180—44X |
| 3,107,763 | 10/1963 | Hill | 180—44X |
| 3,191,708 | 6/1965 | Simonds et al. | 74—710.5 |
| 3,378,093 | 4/1968 | Hill | 74—710.5X |

LEONARD H. GERIN, Primary Examiner

U.S. Cl. X.R.
74—714; 180—44